United States Patent [19]

Singh et al.

[11] Patent Number: 6,010,676
[45] Date of Patent: *Jan. 4, 2000

[54] METHOD FOR MAKING A HIGHLY PURE TANTALUM COMPOUND

[75] Inventors: Raj P. Singh, Sayre; Michael J. Miller, Towanda, both of Pa.

[73] Assignee: Osram Sylvania Inc., Danvers, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/928,369

[22] Filed: Sep. 12, 1997

[51] Int. Cl.[7] .............................. C01G 35/02; C01G 35/00
[52] U.S. Cl. .......................... 423/464; 423/592; 423/63; 423/65; 423/66
[58] Field of Search ............................... 423/63, 66, 464, 423/592, 65

[56] References Cited

U.S. PATENT DOCUMENTS

| | | | |
|---|---|---|---|
| 3,117,833 | 1/1964 | Pierret | 23/19 |
| 3,712,939 | 1/1973 | Capps et al. | 423/63 |
| 3,907,976 | 9/1975 | Hogen, Jr. et al. | 423/464 |
| 4,041,138 | 8/1977 | Glaeser et al. | 423/464 |
| 4,446,115 | 5/1984 | Endo et al. | 423/63 |
| 4,537,750 | 8/1985 | Ritsko et al. | 423/65 |
| 4,663,130 | 5/1987 | Bergman et al. | 423/68 |
| 4,673,554 | 6/1987 | Niwa et al. | 423/63 |
| 4,942,024 | 7/1990 | Sasaki et al. | 423/65 |
| 5,635,146 | 6/1997 | Singh et al. | 423/65 |

FOREIGN PATENT DOCUMENTS

| | | |
|---|---|---|
| 0034348 | 8/1981 | European Pat. Off. . |
| 0241278 | 10/1987 | European Pat. Off. . |
| 1 066 188 | 10/1969 | Germany ............... 423/464 |
| 2537354A1 | 2/1977 | Germany . |

OTHER PUBLICATIONS

Nassau et al, Quenched Metastable Glassy and Crystalline Phases in the System Lithium–Sodium–Potassium Metatantalate, J. Amer. Cer. Soc., 62(1–2), 74–79 (1978) (No month).

Borchers et al., Extractive Metallurgy of Tantalum, Extractive Metallurgy of Refractory Metals, The Metallurgical Society of AIME, 110th AIME Annual Meeting, 95–106 (Feb. 22–26, 1981).

Tantalum, Elements, 12–17 (1992) (no month).

Abstract, Derwent WPI, JP 043298808 A, (1992) (no month).

Bielecki, Use of Ion Exchange Techniques for Production of High–purity Potassium Fluorotantalate, Advances in Extractive Metallurgy, The Institute of Mining and Metallurgy, London, 777–788 (Apr. 17–20, 1967).

Carlson et al., Pure Columbium and Tantalum Oxides by Liquid–Liquid Extraction, Journal of Metals, 472–475 (Jun. 1960).

Droeghkamp et al., Tantalum and Tantalum Compounds, Kirk–Othmer Encyclopedia of Chemical Technology, Third Ed., v.22, 541–565, John Wiley & Sons (1983) (no month).

Baram, Kinetics of Dissolution of Niobium and Tantalum Pentoxides in Hydrofluoric Acid, Journal of Applied Chemistry of the USSR, 38, 2181–2188 (1965) (no month).

Zelikman et al., Chapter III: Tantalum and Niobium, Metallurgy of Rare Metals, U.S. Dept. of Commerce, 99–154 (1966) (no month).

*Primary Examiner*—Ngoc-Yen Nguyen
*Attorney, Agent, or Firm*—Robert F. Clark

[57] ABSTRACT

Highly pure tantalum compounds are made by slurrying hydrated ammonium tantalum oxide or tantalum hydroxide with concentrated sulfuric acid followed by dissolution with concentrated hydrofluoric acid. After diluting the concentrated acidic solution with water, a soluble potassium compound is added to precipitate a highly pure potassium fluorotantalate. Further steps are used to convert the highly pure potassium fluorotantalate into a highly pure tantalum oxide.

7 Claims, 1 Drawing Sheet

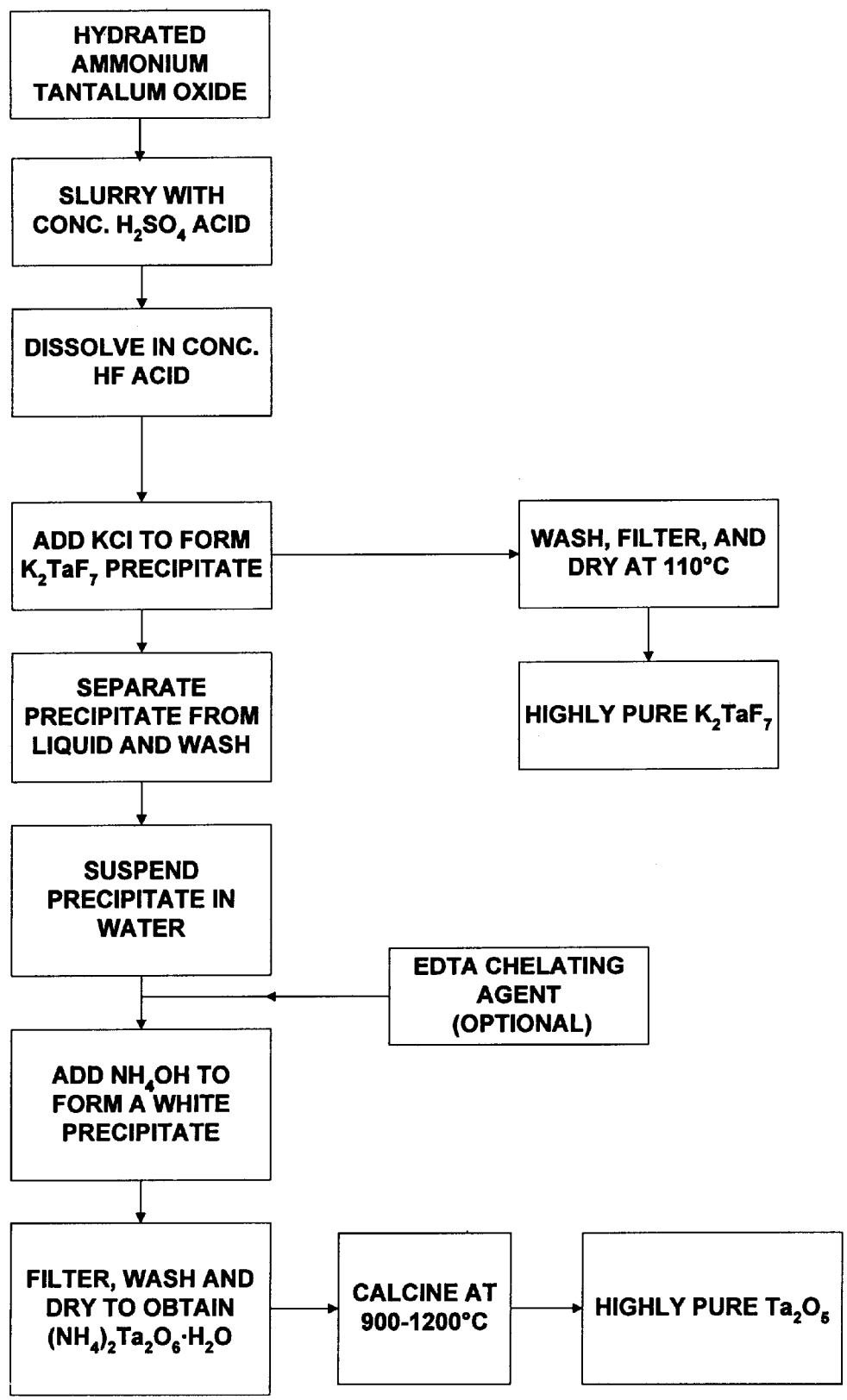

METHOD FOR MAKING A HIGHLY PURE TANTALUM COMPOUND

TECHNICAL FIELD

This invention relates to methods for the processing and purification of tantalum containing ores and compounds. In particular, it relates to methods of producing high purity tantalum compounds ($K_2TaF_7$ and $Ta_2O_5$) from standard technical grade hydrated ammonium tantalum oxide (($NH_4)_{2-x}H_xTa_2O_6 \cdot nH_2O$) and/or tantalum hydroxide ($Ta_2O_5 \cdot nH_2O$).

BACKGROUND ART

High purity tantalum metal and tantalum pentoxide have become increasingly important to the electronics industry in the preparation of advanced electronic materials used in the manufacture of devices such as surface acoustic wave filters, pyroelectric infrared sensors and optoelectronic devices. High purity tantalum pentoxide is also required for the preparation of tantalate X-ray phosphors for X-ray intensifier screens. The purity of tantalum metal and tantalum pentoxide used in the manufacture of such products should be very high, especially, with respect to certain transition metals such as niobium.

Prior to 1957, niobium was separated from tantalum by a fractional crystallization process known as the Marignac process which exploits the difference in solubility between $K_2TaF_7$ and $K_2NbOF_5 \cdot H_2O$. However, tantalum pentoxide obtained by this process contained large impurities of Nb (1000–3000 ppm), and other elements such as Si (up to 3000 ppm), Ti (up to 100 ppm), and Fe (up to 2000 ppm).

In late 1950's, modern solvent extraction and ion exchange processes supplanted the use of the Marignac process. Examples of liquid—liquid solvent extraction and ion exchange methods are disclosed in U.S. Pat. Nos. 3,117,833, 3,712,939, 4,673,554 and U.S. Pat. No. 4,446,115. In a solvent extraction process, ore concentrates containing at least 25 wt.% tantalum and niobium pentoxide are decomposed chemically in hydrofluoric acid media and the dissolved tantalum and niobium species are separated from the residue by filtration. The filtrate containing tantalum (as $TaF_7^{2-}$) and niobium (as $NbOF_5^{2-}$) in an $HF/H_2SO_4$ medium is brought into contact with an organic phase, usually methyl iso-butyl ketone (MIBK), which selectively adsorbs tantalum and niobium species leaving impurities such as titanium, iron, and silicon in the aqueous phase. Niobium is separated from tantalum by back extraction with sulfuric acid. Finally, tantalum ($TaF_7^{2-}$) is eluted from organic phase (MIBK) by an ammonium fluoride solution and converted into hydrated ammonium tantalum oxide by precipitation with ammonium hydroxide. The hydrated ammonium tantalum oxide is amorphous and contains a significant amount of ammonia, water and fluoride which are removed by calcination between 750–1300° C. which converts the amorphous material to a low temperature crystalline phase of tantalum pentoxide or $\beta$-$Ta_2O_5$.

The tantalum pentoxide prepared by this method normally contains impurities such as Al, Si, F, Cl, K, Na, Cr, Fe, Co, Ni, Cu, Ti, Zr, Mo, Nb, and W with total weight of impurities at about between 0.1 to 1%. Although $Ta_2O_5$ (or $K_2TaF_7$) made by solvent extraction method can be used for most applications, this material is not suitable for the preparation of electronic materials. Optical grade tantalum pentoxide which is lower in transition metals, and some other elemental impurities depending on the specific application, is normally required for the preparation of electronic materials such as surface acoustic wave filters, pyro-electric infrared sensors, and opto-electronic devices, and X-ray phosphors. For example, for X-ray phosphors, the total transition metal impurities by weight should not exceed 10 to 20 ppm.

Preparation of optical grade tantalum oxide requires either a sophisticated chlorination process or multiple extraction/back extraction cycles by solvent extraction. Because of this, the cost of optical grade tantalum oxide is remarkably high as compared to standard technical grade tantalum pentoxide. Moreover, it is almost impossible to completely remove niobium by chlorination or multiple extraction/back extraction cycles of solvent extraction.

U.S. Pat. No. 5,635,146 which is incorporated herein by reference describes an alternative method for the purification of tantalum pentoxide. However, extra steps are required to convert the impure tantalum pentoxide to a soluble potassium tantalate prior to dissolution.

SUMMARY OF THE INVENTION

It is an object of the invention to obviate the disadvantages of the prior art.

It is another object of the invention to produce highly pure tantalum compounds from impure tantalum containing compounds using a direct dissolution method.

It is a further object of the invention to produce a highly pure tantalum pentoxide having a total transition metal content of less than about 25 ppm.

In accordance with one aspect the invention, there is provided a method for making a highly pure tantalum compound. A slurry is formed of an impure tantalum compound and a concentrated sulfuric acid, the tantalum compound being selected from hydrated ammonium tantalum oxide or tantalum hydroxide. The slurry is dissolved in a concentrated hydrofluoric acid medium to form a solution containing tantalum values and impurities and a soluble potassium compound is added to the solution to precipitate potassium fluorotantalate. The potassium fluorotantalate is separated from the solution containing the impurities whereby a highly pure potassium fluorotantalate is obtained.

In accordance with another aspect of the invention, the highly pure potassium fluorotantalate is suspended in water and a chelating agent optionally is added. Ammonium hydroxide is then added to the suspension while continuously stirring to form a hydrated ammonium tantalum oxide precipitate. The precipitate is filtered, washed, dried and calcined to form a highly pure tantalum pentoxide.

BRIEF DESCRIPTION OF THE DRAWINGS

The Figure is a block diagram illustrating a method of the invention.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawing.

It has been discovered that hydrated ammonium tantalum oxide (HATO), and related compounds such as tantalum hydroxide, which contain relatively high impurity levels can be used to produce an optical grade or electronic grade tantalum pentoxide by a direct dissolution process. Preferably, the highly pure tantalum pentoxide produced by this process has a total transition metal (Ti, V, Cr, Mn, Fe, Co, Ni, Cu, Zn, Zr, Nb, Sn and Pb) content of less than about 25 ppm and more preferably less than about 10 ppm. In particular, the amount of niobium in the highly pure tantalum pentoxide produced by this process is less than about 10% of the niobium (on a $Ta_2O_5$ basis) contained in the impure starting material.

In general, the HATO is slurried with concentrated sulfuric acid and then dissolved directly in concentrated hydrofluoric acid. Once dissolved, the concentrated solution is diluted with water and a soluble potassium compound such as potassium chloride is added to precipitate potassium fluorotantalate ($K_2TaF_7$). At this point, the potassium fluorotantalate precipitate can be washed, filtered, and dried to yield a highly pure material or it can be re-suspended in water for additional processing.

To make a highly pure tantalum pentoxide (especially with respect to transition metal impurities), the re-suspended $K_2TaF_7$ precipitate is continuously stirred while ammonium hydroxide is added whereby a white precipitate of hydrated ammonium tantalum oxide is formed. Prior to adding the ammonium hydroxide, a chelating agent such as EDTA may be added to the suspension. The white precipitate is filtered, washed, dried and calcined at 900–1200° C. to form a highly pure tantalum pentoxide.

The following non-limiting examples are presented.

EXAMPLE 1

A 125 g amount of an impure amorphous hydrated ammonium tantalum oxide (HATO) (Table 1) was dissolved in 225 mL of concentrated hydrofluoric (HF) acid (29 M). The concentrated solution was diluted with 4.5 liters of deionized (DI) water and 100 g of KCl was added to precipitate $K_2TaF_7$. The supernate was decanted leaving about a one liter slurry. A one liter volume of DI water was added to the slurry and solid was separated by filtration. The cake on the filter paper was washed with 2 l of DI water. The washed precipitate of $K_2TaF7$ was suspended into 6 l of DI water. The suspension was mixed well with a stirring rod and 1 g of EDTA (solid powder) was added. After stirring well to homogeneously mix the EDTA, 800 ml of 15M ammonium hydroxide was added while continuously stirring the suspension. The white precipitate of hydrated ammonium tantalum oxide which formed was left in the mother liquor overnight. The precipitate was filtered, washed to neutral pH, and dried at 110° C. The dried hydrated ammonium tantalum oxide was calcined in a silica crucible at 950° C. for 15 to 16 hours to convert it to tantalum oxide. The calcined $Ta_2O_5$ was characterized by X-ray diffraction (XRD), glow discharge mass spectrometry (GDMS), BET specific surface area measurements (BET), and infrared spectroscopy (IR) methods.

EXAMPLE 2

The procedure used in Example 1 was followed except that the impure HATO (125 g) was slurried in 125 mL of concentrated sulfuric acid (18M $H_2SO_4$) before dissolution in 225 mL of 29M HF.

The impurity levels in the tantalum pentoxide made in Examples 1 and 2 are presented in Table 1 and compared with the levels in the HATO starting material. The results presented in Table 1 show that use of concentrated $H_2SO_4$ in the process greatly reduced the concentration of Nb, and other elements, in the purified $Ta_2O_5$. Other experiments have confirmed that the starting material must be slurried with concentrated sulfuric acid in order to produce a highly pure tantalum compound. In particular, the concentration of the niobium impurity in the product was not affected by varying the amount of 29M HF when concentrated sulfuric acid was not used. With respect to niobium, a set of designed experiments determined the relationship between the concentration of niobium in the product and the amounts of concentrated sulfuric and hydrofluoric acids used in the dissolution step to be defined by the following equation:

$$1/Nb = 0.44 - 0.008(X_{H2SO4}) + 0.00054(X_{HF}) + 0.000044(X_{H2SO4})(X_{HF})$$

where $X_{H2SO4}$ and $X_{HF}$ are the amounts (in ml) of 18M $H_2SO_4$ and 29M HF, respectively.

TABLE 1

| | Concentration with respect to $Ta_2O_5$, ppm | | |
|---|---|---|---|
| Element | HATO Starting Material* | $Ta_2O_5$ Example 1 (HF only) | $Ta_2O_5$ Example 2 ($H_2SO_4$/HF) |
| Ti | 3–4 | 4.4 | 0.9 |
| V | <1 | <0.1 | <0.1 |
| Cr | 6–32 | 3 | 0.3 |
| Mn | 2–11 | <0.1 | <0.1 |
| Fe | 49–340 | 13 | 0.5 |
| Co | 1–3 | 0.3 | <0.1 |
| Ni | 5–8 | 0.2 | <0.1 |
| Cu | 5–10 | <1 | <1 |
| Zn | 6–16 | 0.4 | 0.4 |
| Zr | 1–4 | 0.6 | <0.2 |
| Nb | 140–900 | 130 | 10 |
| Sn | <1 | 0.7 | 0.2 |
| Pb | 1–8 | 3.2 | 0.2 |

*Mixture of three samples containing varied amounts of impurities.

EXAMPLE 3

The same procedure as in Example 1 was followed except that the impure HATO (Table 2) was slurried in 250 ml of 18M $H_2SO_4$ before dissolution in 275 ml of 29M HF. Table 2 contrasts the impurity levels measured for the resultant $Ta_2O_5$ with the HATO starting material.

TABLE 2

| | Concentrations with respect to $Ta_2O_5$, ppm | |
|---|---|---|
| Element | HATO | $Ta_2O_5$ Example 3 |
| Li | 0.7 | <0.1 |
| Na | 450 | 42 |
| Mg | 17 | 0.6 |
| Al | 71 | 160 |
| Si | 14000 | 43 |
| P | 120 | 1.6 |
| S | 140 | 6.2 |
| Cl | 0.6 | 0.2 |
| Ca | 1900 | 10 |
| Ti | 17 | 5.1 |
| V | 0.27 | <0.1 |
| Cr | 61 | 1.1 |
| Mn | 1.2 | <0.1 |
| Fe | 63 | 2.1 |
| Co | 1.0 | 0.1 |
| Ni | 0.7 | <0.1 |
| Cu | 2.7 | <0.5 |
| Zn | 7.2 | 0.6 |
| Sr | 4.3 | <0.1 |
| Y | 5.5 | 0.2 |
| Zr | 5.5 | 0.3 |
| Nb | 440 | 9.9 |
| Mo | 0.8 | 0.3 |

TABLE 2-continued

| | Concentrations with respect to $Ta_2O_5$, ppm | |
|---|---|---|
| Element | HATO | $Ta_2O_5$ Example 3 |
| Sn | 3.1 | 1.4 |
| W | 95 | 2.7 |
| Pb | 1.7 | 0.1 |

EXAMPLE 4

The same procedure as in Example 3 was followed except that an amorphous tantalum hydroxide (TH) (Table 3) was used in place of HATO for purification. The procedure was scaled down by 50%.

TABLE 3

| | Concentrations with respect to $Ta_2O_5$, ppm | |
|---|---|---|
| Element | TH | $Ta_2O_5$ Example 4 |
| Ti | 11 | 3.7 |
| V | 0.3 | <0.1 |
| Cr | 6.5 | 0.5 |
| Mn | 0.5 | <0.1 |
| Fe | 61 | 1.7 |
| Co | 1.2 | <0.1 |
| Ni | 2.1 | <0.1 |
| Cu | 3.9 | <0.5 |
| Zn | 1.2 | <0.5 |
| Zr | 4.2 | 0.8 |
| Nb | 2.1 | 0.1 |
| Sn | 1.8 | 1.1 |
| Pb | 0.6 | 0.2 |

Thus, it has been shown that highly pure tantalum compounds can be produced using hydrated ammonium tantalum oxide (or related compounds) as a source material.

While there has been shown and described what are at the present considered the preferred embodiments of the invention, it will be obvious to those skilled in the art that various changes and modifications may be made therein without departing from the scope of the invention as defined by the appended claims.

We claim:

1. A method for making a highly pure tantalum compound, consisting essentially of:

forming a slurry of an impure tantalum compound and a concentrated sulfuric acid, the tantalum compound being selected from hydrated ammonium tantalum oxide or tantalum hydroxide;

dissolving the slurry in a concentrated hydrofluoric acid medium to form a solution containing tantalum values and impurities;

adding a soluble potassium compound to the solution to precipitate potassium fluorotantalate; and separating the potassium fluorotantalate from the solution containing the impurities to obtain a highly pure potassium fluorotantalate.

2. The method of claim 1 further comprising forming a suspension of the potassium fluorotantalate in water, optionally adding a chelating agent to the suspension, adding ammonium hydroxide to the suspension while continuously stirring to form a hydrated ammonium tantalum oxide precipitate, and filtering, washing, drying and calcining the hydrated ammonium tantalum oxide precipitate to form a highly pure tantalum pentoxide.

3. The method of claim 2 wherein the amount of niobium in the highly pure tantalum pentoxide is less than about 10% of the amount of niobium in the impure tantalum compound based on tantalum pentoxide.

4. The method of claim 2 wherein the highly pure tantalum pentoxide has a total transition metal content of less than about 25 ppm.

5. The method of claim 4 wherein the total transition metal content is less than about 10 ppm.

6. The method of claim 1 wherein the potassium compound is potassium chloride.

7. The method of claim 2 wherein the hydrated ammonium tantalum oxide precipitate is calcined at 900–1200° C.

* * * * *